(12) United States Patent
Coates

(10) Patent No.: US 9,187,180 B2
(45) Date of Patent: Nov. 17, 2015

(54) THERMAL PNEUMATIC DEICING SYSTEM FOR AN AIRCRAFT RAM AIR HEAT EXCHANGER

(71) Applicant: HAMILTON SUNDSTRAND CORPORATION, Windsor Locks, CT (US)

(72) Inventor: Laura Jean Coates, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 301 days.

(21) Appl. No.: 13/901,714

(22) Filed: May 24, 2013

(65) Prior Publication Data

US 2014/0346278 A1   Nov. 27, 2014

(51) Int. Cl.
*B64D 13/00*   (2006.01)
*B64D 13/06*   (2006.01)

(52) U.S. Cl.
CPC ........ *B64D 13/00* (2013.01); *B64D 2013/0618* (2013.01); *B64D 2013/0666* (2013.01)

(58) Field of Classification Search
CPC .............. B64D 2013/0607; B64D 2013/0614; B64D 2013/0618; B64D 2013/0666; B64D 13/08; B64D 15/04; B64D 15/02; B64D 15/00
See application file for complete search history.

(56) References Cited

U.S. PATENT DOCUMENTS

| | | | |
|---|---|---|---|
| 2,465,728 A * | 3/1949 | Johnson | 244/118.5 |
| 3,981,466 A * | 9/1976 | Shah | 244/134 R |
| 4,406,431 A * | 9/1983 | Heuberger | 244/53 B |
| 4,504,030 A | 3/1985 | Kniat et al. | |
| 5,043,558 A * | 8/1991 | Byles | 219/201 |
| 5,253,484 A * | 10/1993 | Corman et al. | 62/239 |
| 5,327,744 A | 7/1994 | Frawley et al. | |
| 5,553,461 A * | 9/1996 | Hitzigrath et al. | 62/150 |
| 5,701,755 A * | 12/1997 | Severson et al. | 62/402 |
| 5,860,283 A * | 1/1999 | Coleman et al. | 62/87 |
| 6,205,803 B1 * | 3/2001 | Scaringe | 62/259.2 |
| 6,408,641 B1 | 6/2002 | Skur, III | |
| 6,663,044 B1 | 12/2003 | Munoz et al. | |
| 6,729,156 B2 * | 5/2004 | Sauterleute et al. | 62/401 |
| 7,727,057 B2 * | 6/2010 | Beier et al. | 454/76 |
| 7,975,966 B2 * | 7/2011 | De Souza et al. | 244/134 B |
| 8,042,343 B2 | 10/2011 | Jarlestal | |
| 8,061,657 B2 * | 11/2011 | Rocklin et al. | 244/134 B |
| 8,272,930 B2 * | 9/2012 | Klimpel et al. | 454/71 |
| 8,292,222 B2 * | 10/2012 | Solntsev et al. | 244/118.5 |

(Continued)

FOREIGN PATENT DOCUMENTS

WO    2009064288 A1    5/2009

OTHER PUBLICATIONS

Extended European Search Report for EP Application No. 14169521.3-1754, dated Oct. 8, 2014, pp. 1-4.

*Primary Examiner* — Brian M O'Hara
*Assistant Examiner* — Michael Kreiner
(74) *Attorney, Agent, or Firm* — Cantor Colburn LLP

(57) ABSTRACT

A thermal pneumatic deicing system for deicing a RAM air heat exchanger includes an environmental control system (ECS) including a RAM air heat exchanger and an outlet, an electronics housing including a plurality of electronic components, and a duct fluidically connecting the RAM air heat exchanger and the electronics housing. The duct includes a valve. A controller is operatively connected to the valve. The controller is configured and disposed to selectively fluidically connect the RAM air heat exchanger and the electronics housing to facilitate deicing of the heat exchanger.

12 Claims, 2 Drawing Sheets

(56) References Cited

U.S. PATENT DOCUMENTS

| | | |
|---|---|---|
| 8,298,055 B2 | 10/2012 | Schiek |
| 8,351,200 B2 | 1/2013 | Arimilli et al. |
| 8,857,767 B2* | 10/2014 | Stolte et al. ............... 244/134 B |
| 2009/0084896 A1 | 4/2009 | Boucher et al. |
| 2011/0259546 A1 | 10/2011 | DeFrancesco et al. |
| 2012/0000630 A1* | 1/2012 | Reiss et al. ............... 165/104.21 |
| 2012/0285665 A1 | 11/2012 | Rebeyrotte et al. |
| 2012/0291996 A1* | 11/2012 | Nilsson et al. ........... 165/104.11 |
| 2012/0312037 A1 | 12/2012 | Finney et al. |
| 2013/0118194 A1* | 5/2013 | Mar ................................ 62/115 |
| 2013/0277015 A1* | 10/2013 | Scholl et al. ............. 165/104.19 |
| 2014/0109603 A1* | 4/2014 | Fernandes et al. ................ 62/89 |

\* cited by examiner

THERMAL PNEUMATIC DEICING SYSTEM FOR AN AIRCRAFT RAM AIR HEAT EXCHANGER

BACKGROUND OF THE INVENTION

Exemplary embodiments pertain to the art of aircraft systems and, more particularly, to a thermal pneumatic deicing system for an aircraft RAM air heat exchanger.

Aircraft include environmental control systems (ECS) that provide air supply, thermal control, and cabin pressurization for aircrew and passengers. Many ECS include a RAM air system including primary, and often times secondary, heat exchangers. In some cases, the primary and secondary heat exchangers are integrated into a single system. The RAM air system also generally includes a scoop that delivers a cooling airflow to the heat exchanger(s). As a consequence of using external air, the heat exchanger(s) often times experience ice build-up. The ice build-up reduces airflow through the heat exchanger(s) lowering system efficiency and increasing risk of Air Cycle Machine (ACM) surge.

BRIEF DESCRIPTION OF THE INVENTION

Disclosed is a thermal pneumatic deicing system for deicing a RAM air heat exchanger including an environmental control system (ECS) including a RAM air heat exchanger and an outlet, an electronics housing including a plurality of electronic units, and a duct fluidically connecting the RAM air heat exchanger and the electronics housing. The duct includes a valve. A controller is operatively connected to the valve. The controller is configured and disposed to selectively fluidically connect the RAM air heat exchanger and the electronics housing to facilitate deicing of the heat exchanger.

Also disclosed is an aircraft including a fuselage extending from a nose portion to a tail portion through a body portion. The fuselage includes an aircraft cabin, first and second wings projecting from the body portion, and a thermal pneumatic deicing system including an environmental control system (ECS) including a RAM air heat exchanger having a heat exchanger face and an outlet, an electronics housing including a plurality of electronic units, and a duct fluidically connecting the RAM air heat exchanger and the electronics housing. The duct includes a valve. A controller is operatively connected to the valve. The controller is configured and disposed to selectively fluidically connect the RAM air heat exchanger and the electronics housing to facilitate deicing of the heat exchanger.

Further disclosed is a method of deicing a RAM air heat exchanger in an aircraft. The method includes directing a cooling airflow into an electronics housing, exchanging heat between electronics in the electronics housing and the cooling airflow forming a heated airflow, and selectively guiding the heated airflow to the RAM air heat exchanger.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
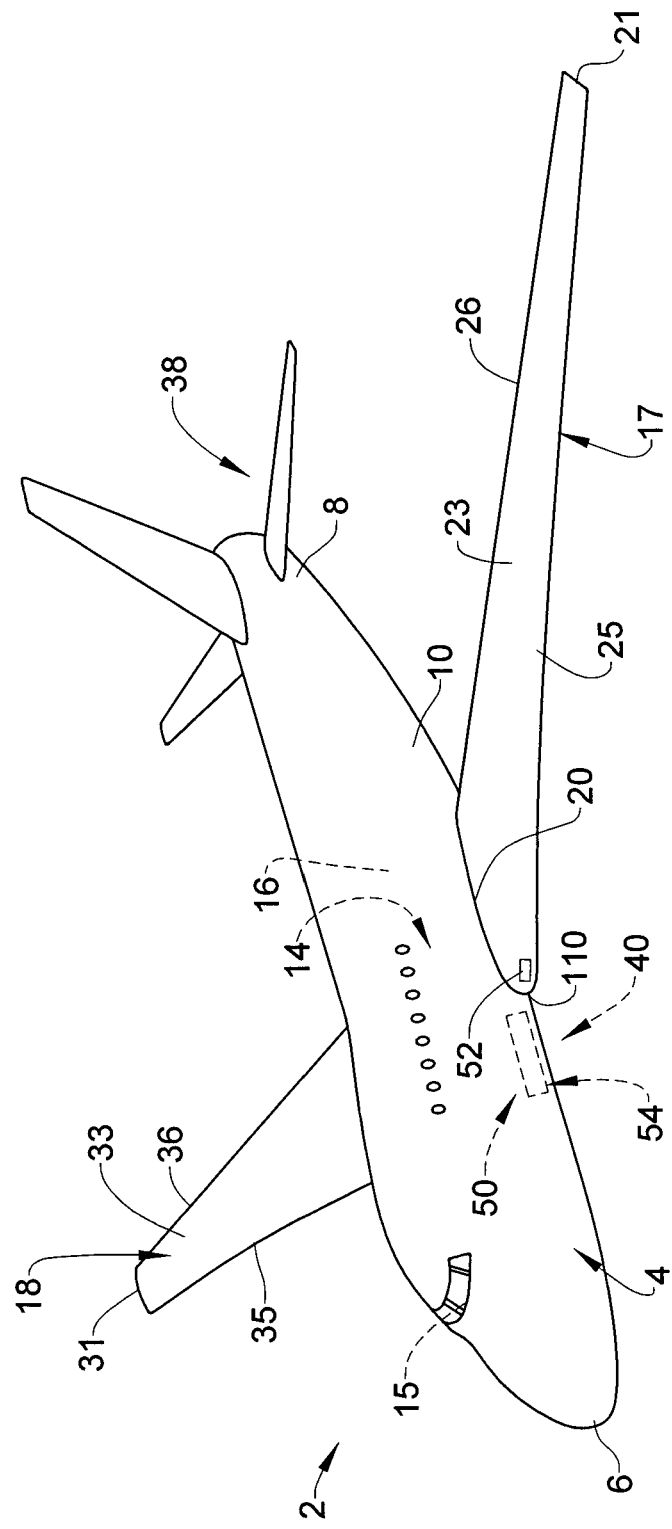
FIG. 1 is a perspective view of an aircraft having a thermal pneumatic deicing system for a RAM air heat exchanger in accordance with an exemplary embodiment.

An aircraft, in accordance with an exemplary embodiment, is indicated generally at 2 in FIG. 1. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. In the exemplary embodiment shown, aircraft 2 includes a thermal pneumatic deicing system 40. The term "deicing system" should be understood to describe a system that prevents ice build-up from surfaces and also may remove ice already built up on a surface. The term "thermal pneumatic deicing system" should be understood to describe a system that prevents and/or removes ice using conditioned air.

Figure 2:
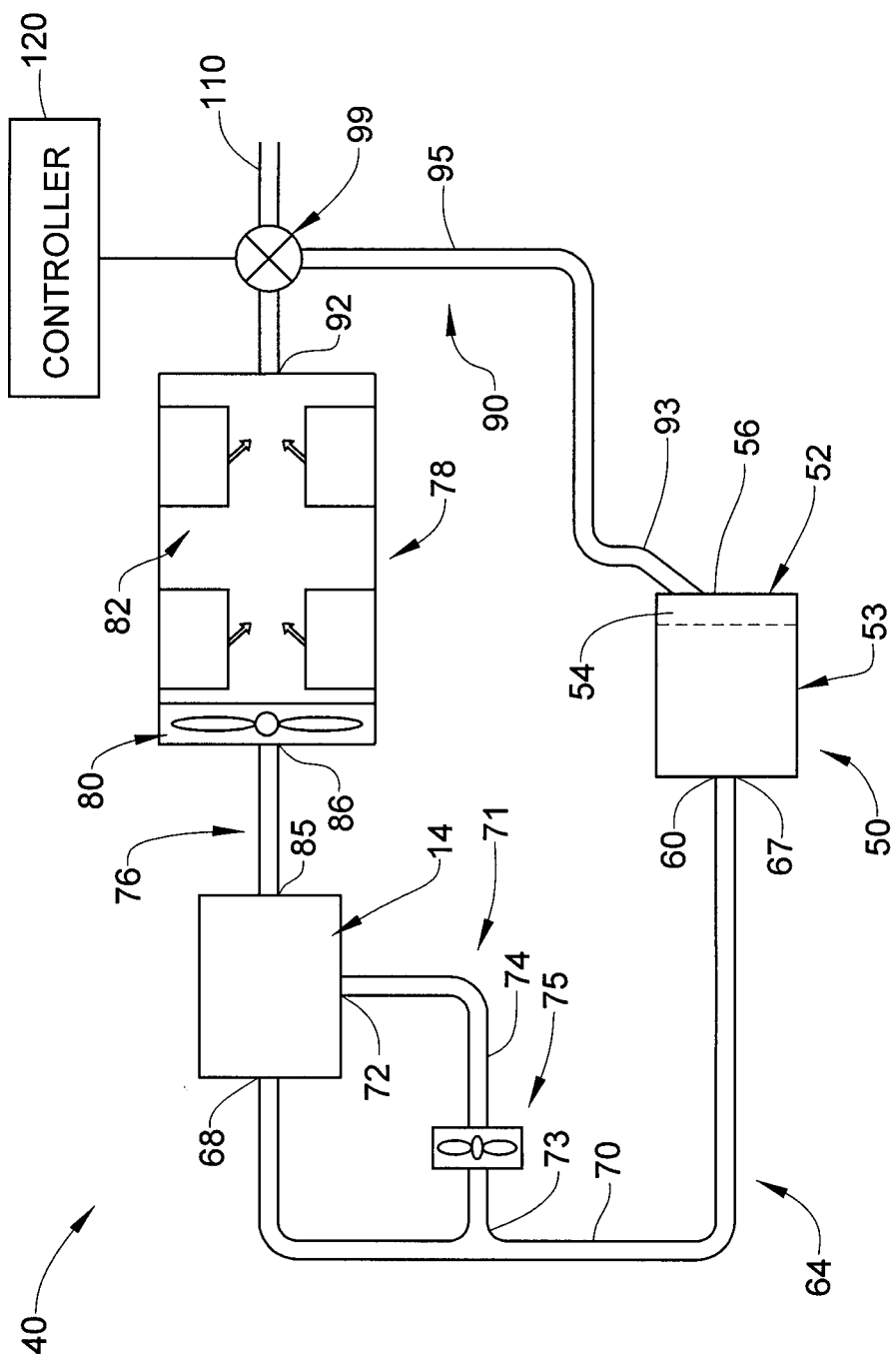
FIG. 2 is a block diagram illustrating the thermal pneumatic deicing system of FIG. 1

As shown in FIG. 2, thermal pneumatic deicing system 40 includes an environmental control system (ECS) 50 mounted in body portion 10 of aircraft 2. ECS 50 includes an inlet 52 which, in the exemplary embodiment shown, is positioned near leading edge 25 of first wing 17 (FIG. 1). It should however be understood that inlet 52 may be arranged in other locations. Inlet 52 is fluidically connected with a RAM air system 53 having a RAM air heat exchanger 54. RAM air heat exchanger 54 includes a RAM air heat exchanger face 56 that receives an airflow from inlet 52. RAM air system 53 also includes an outlet 60 that delivers conditioned air to aircraft cabin 14 through a cabin air duct 64. More specifically, cabin air duct 64 extends from a first end 67, fluidically connected to outlet 60, to a second end 68 through an intermediate portion 70. Second end 68 is fluidically connected with, and delivers conditioned air to, aircraft cabin 14 (represented schematically as a box in FIG. 2). A recirculation duct 71 extends from a first end 72 to a second end 73 through an intermediate portion 74 having a fan 75. Fan 75 draws a portion of the conditioned air from aircraft cabin 14 back to intermediate portion 70 of cabin air duct 64.

An electronics housing cooling duct 76 extends between aircraft cabin 14 and an electronics housing 78. Electronics housing 78 includes a fan 80 that draws cooling air from aircraft cabin 14 to provide convection cooling for electronic components, indicated generally at 82. More specifically, electronics housing cooling duct 76 extends from a first end 85, fluidically connected to aircraft cabin 14, to a second end 86 fluidically connected with electronics housing 78. Cooling air from aircraft cabin 14 is passed in a heat exchange relationship with electronic components 82 forming a heated airflow. RAM air system 53 delivers ambient air to aircraft cabin 14. The ambient air is conditioned, or heated, prior to entering aircraft cabin 14. During flight, RAM air heat exchanger 54 may experience an icing condition that reduces airflow efficiency. In particular, ice may form at RAM air heat exchanger face 56 reducing airflow into RAM air system 53.

In accordance with the exemplary embodiment, thermal pneumatic deicing system 40 includes a deicing duct 90 that selectively delivers the heated airflow from electronics housing 78 to RAM air heat exchanger 54. More specifically, deicing duct 90 extends from a first end section 92, fluidically connected with electronics housing 78, to a second end section 93 through an intermediate section 95. Second end section 93 is positioned to deliver the heated airflow onto RAM air heat exchanger face 56 and into RAM air heat exchanger 54. The heated airflow thaws any ice than may have formed on RAM air heat exchanger 54. A valve 99 is arranged along intermediate section 95. Valve 99 selectively delivers the heated airflow to RAM air heat exchanger 54 and an outlet duct 110 that leads to ambient. Outlet duct 110 is provided in body portion 10 of fuselage 4 (as shown in FIG. 1). A controller 120 is operatively connected to valve 99. Controller 120 may include sensors (not shown) that indicate an ice build up on RAM air heat exchanger face 56 or may selectively command valve 99 to open and divert the heated airflow from passing to ambient and, instead, flow to RAM air heat exchanger 54 during flight conditions known to produce ice.

At this point it should be understood that the exemplary embodiment describes a system that selectively delivers heated airflow from an electronics housing to a RAM air heat exchanger for deicing. The thermal pneumatic deicing system includes a controller that operates a valve to deliver a deicing airflow to the RAM air heat exchanger or releases the heated airflow to ambient. The controller may use sensors to detect an icing condition or may deliver the deicing airflow under flight conditions known to produce icing. Further, it should be understood that the type, number, and location of the electronic components may vary. It should also be understood that additional components, accessories, ducts and the like may be fluidically connected to the deicing system.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A thermal pneumatic deicing system for deicing a RAM air heat exchanger comprising:
    an environmental control system (ECS) including a RAM air heat exchanger and an outlet;
    an electronics housing including a plurality of electronic components;
    a deicing duct fluidically connecting the RAM air heat exchanger and the electronics housing, the duct deicing including a valve; and
    a controller operatively connected to the valve, the controller being configured and disposed to selectively fluidically connect the RAM air heat exchanger and the electronics housing to facilitate deicing of the heat exchanger.

2. The thermal pneumatic deicing system according to claim 1, wherein the ECS includes a inlet configured and disposed to direct an airflow through the RAM air heat exchanger toward the outlet.

3. The thermal pneumatic deicing system according to claim 2, further comprising: an aircraft cabin and a cabin air duct extending from a first end fluidically connected to the outlet to a second end fluidically connected to the aircraft cabin through an intermediate portion.

4. The thermal pneumatic deicing system according to claim 3, further comprising: a recirculation duct fluidically connected between the aircraft cabin and the intermediate portion of the cabin air duct.

5. The thermal pneumatic deicing system according to claim 3, further comprising: an electronics housing cooling duct extending from a first end fluidically connected to the aircraft cabin to a second end fluidically connected to the electronics housing.

6. The thermal pneumatic deicing system according to claim 1, further comprising: an outlet duct fluidically connected between the valve and ambient.

7. An aircraft comprising:
    a fuselage extending from a nose portion to a tail portion through a body portion, the fuselage including an aircraft cabin;
    first and second wings projecting from the body portion; and
    a thermal pneumatic deicing system including:
        an environmental control system (ECS) including a RAM air heat exchanger and an outlet;
        an electronics housing including a plurality of electronic components;
        a duct fluidically connecting the RAM air heat exchanger and the electronics housing, the duct including a valve; and
        a controller operatively connected to the valve, the controller being configured and disposed to selectively fluidically connect the RAM air heat exchanger and the electronics housing to facilitate deicing of the heat exchanger.

8. The aircraft according to claim 7, wherein the ECS includes an inlet configured and disposed to direct an airflow through the RAM air heat exchanger toward the outlet.

9. The aircraft according to claim 8, further comprising: an aircraft cabin and a cabin air duct extending from a first end fluidically connected to the outlet to a second end fluidically connected to the aircraft cabin through an intermediate portion.

10. The aircraft according to claim 9, further comprising: a recirculation duct fluidically connected between the aircraft cabin and the intermediate portion of the cabin air duct.

11. The aircraft according to claim 9, further comprising: an electronics housing cooling duct extending from a first end fluidically connected to the aircraft cabin to a second end fluidically connected to the electronics housing.

12. The aircraft according to claim 7, further comprising: an outlet duct fluidically connected between the valve and ambient.

* * * * *